UNITED STATES PATENT OFFICE.

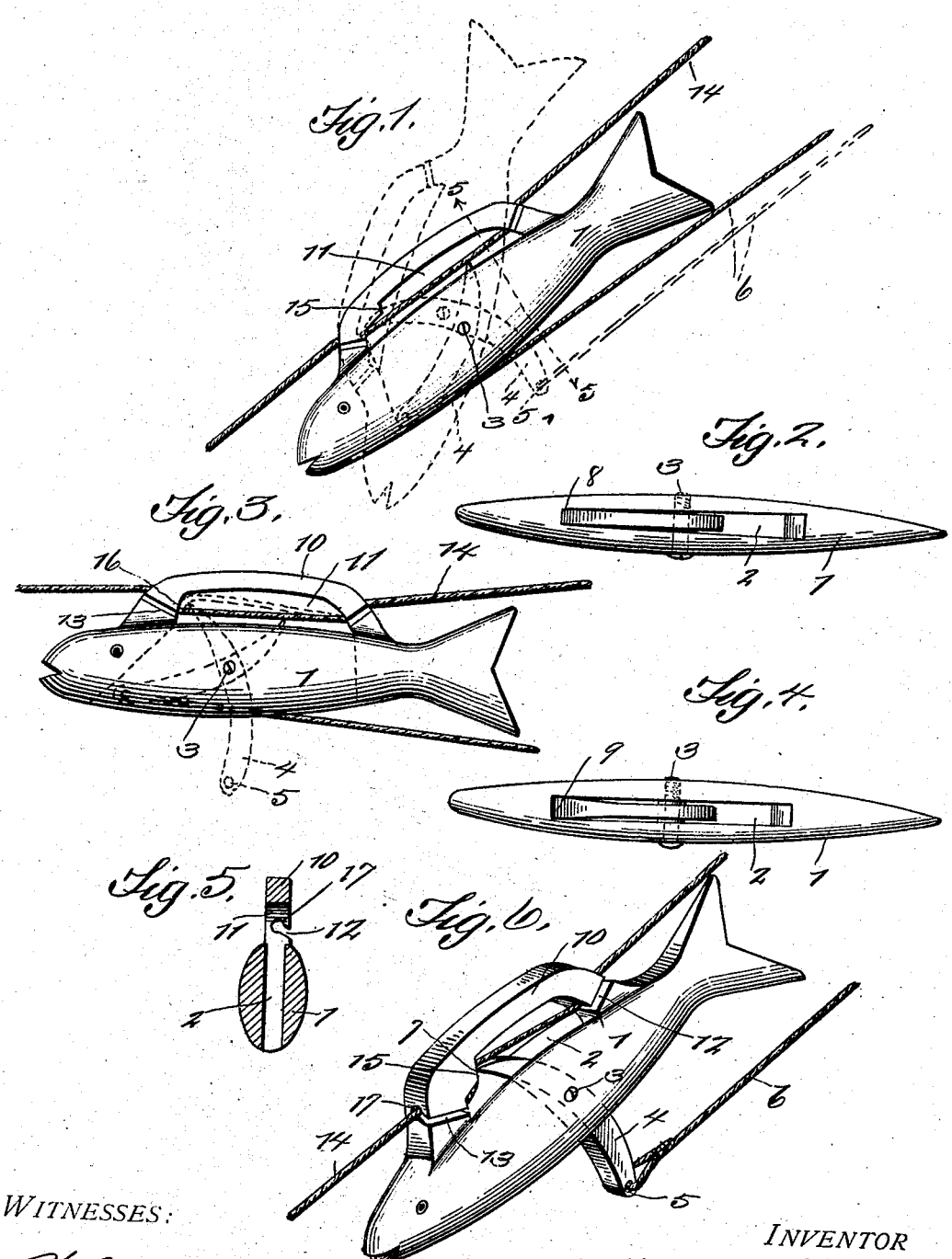

HENRY A. KUNZE, OF ROCHESTER, NEW YORK.

DEVICE FOR CUTTING LINES.

No. 893,173.  Specification of Letters Patent.  Patented July 14, 1908.

Application filed April 6, 1908. Serial No. 425,445.

*To all whom it may concern:*

Be it known that I, HENRY A. KUNZE, of Rochester, in the county of Monroe and State of New York, have invented a new and useful Improvement in Devices for Cutting Lines, which improvement is fully set forth in the following specification, and shown in the accompanying drawings.

This invention relates to certain new and useful improvements in devices for cutting lines such as fish lines under water.

As is well known, it often happens that in fishing the hook becomes caught, under a rock or upon a sunken root or other obstruction and cannot be pulled up, necessitating the breaking of the line, and in many instances the loss of a greater portion of the same.

The present invention has for its objects among others to provide a simple and inexpensive yet efficient device, easily and quickly applied to the line, and, by its own gravity or weight, quickly descending to the point where the hook is held, when by a simple pull upon the line attached thereto the fish line is severed at the point where it is caught, the result being that the only portion lost is the hook and sinker and a very small portion of the line attached thereto. The trigger carrying the cutting member is normally held within a recess in the body portion by friction so that it is out of the way and inclosed so that the device may be conveniently handled and carried in the pocket, also occupies less room or space in packing in packages for shipment or placing on shelves in stores for exhibition and sale to the trade.

Other objects and advantages of the invention will hereinafter appear and the novel features thereof will be particularly pointed out by the appended claims.

The invention is clearly illustrated in the accompanying drawings which, with the numerals of reference marked there on, form a part of this specification, and in which Figure 1 is a perspective view showing the device applied to a fish line. Fig. 2 is a bottom plan. Fig. 3 is a side elevation of a slightly modified form. Fig. 4 is a bottom view showing the slight modification. Fig. 5 is a cross section on the line 5—5 of Fig. 1. Fig. 6 is a perspective view showing the parts in position when the fish line is severed.

Like numerals of reference indicate like parts throughout the several views.

Referring to the drawings 1 designates the body portion of any suitable material, and, while in the present instance I have chosen to show it in the form of a small fish or minnow, it is evident that it may be made of any other convenient form, such, for instance, as that of a toad or it may have the form of any mathematical solid, as a prism, it being understood that the shape or form of the body is not material or may be varied according to the taste or fancy of the maker. It is formed with a vertically disposed recess 2 extending entirely through the body portion, and within this recess, upon a suitable pivot 3 held in the said body is a trigger 4, the one end of which is provided with a hole 5 for the attachment of a cord or string 6 by which it may be manipulated. The other end is sharpened to form a cutting point 7. The forward end, that is, the end toward the head of the minnow, or the end first entering the water, of this recess upon the under side is made slightly narrower than the other portions, as seen at 8 in Fig. 2, so that the end to which the cord 6 is attached will normally be held within the recess by friction which, however, is so slight that an easy pull upon the cord 6 will swing the trigger from the position in which it is shown in full lines in Fig. 1 to that in which it is seen in dotted lines in the same figure. In Fig. 4 I have shown another form of construction whereby the same result, that is, the normal holding of the trigger in its place of inaction by friction when not in use, is attained. This is done by slightly increasing the width of the end of the trigger to which the cord 6 is attached, as seen at 9 in said Fig. 4. The cord 6 is not shown in either Figs. 2 or 4, for the sake of clearness.

Extending from the upper side of the body 1 and bridging the recess 2 therein is an arched portion 10 leaving a space 11 between the same and the top of the body portion, and this arched portion is provided near its opposite ends with the slots or kerfs 12 and 13 which do not extend exactly in alinement with each other but both are inclined slightly downward toward the body of the fish, the inclines being in opposite directions. By this provision the fish line 14 is deflected out of its normal line, as seen in Figs. 1, 3 and 6 and the portion of the fish line that is within the guard or arch is held slightly away from the inner surface of the edge of such guard so that as the cutting edge of the trigger is forced against the line 14, it will carry the latter up with it against an abutment, which, as seen in Figs. 1 and 6, consists of a shoulder 15 formed upon the under side of the guard near its forward end, while in Fig. 3 this abutment is formed by the inner edge of the guard, the result in both instances being substantially the same. The slots or kerfs 12 and 13 in the side wall of the guard are of such depth as to allow the fish line 14 to come centrally under the guard and centrally over the cutting edge of the trigger. The inner ends of the kerfs are somewhat enlarged, as seen at 17 in Figs. 5 and 6, so as to allow the device to glide freely down the fish line. The operation will be readily understood. When the fish line becomes caught under a rock or other obstruction, the device is placed sidewise upon the fish line 14 so that the line will be engaged in the slots or kerfs 12 and 13 and automatically seat itself in the enlarged inner ends 17 thereof, the line 6 being attached in the hole 5 of the trigger 4. The line 6 being free to run out the device on account of its weight glides readily down the line 14 through the water until the nose of the body portion meets the obstruction that is holding the hook. Then a sudden jerk upon the string 6 attached to the trigger will serve to move it from its position seen in full lines in Fig. 1 to its position of dotted lines in Fig. 1, thus cutting the fish line and freeing it so that it may be drawn out of the water, leaving, as lost, only the hook and the sinker.

As above stated, while the trigger is held in its inactive position, that shown by full lines in Figs. 1 and 3, and in Figs. 2 and 4, by sufficient friction to prevent its being accidentally disengaged from its position within the recess, the trigger swings freely on its pivot but an easy pull upon the string 6 will disengage it and leave it free to be thrown into position to cut the fish line. When the minnow is sliding down the fish line, or when in position of rest under water ready to be actuated to cut the fish line, the axis of the minnow will be practically parallel with the fish line, as shown by full lines in Fig. 1. However, when the string 6 is pulled for the purpose of severing the line, the minnow will be tilted to a position relatively somewhat like that indicated by dotted lines in Fig. 1, the pull on the string 6 turning the minnow to this position and thus giving it force which assists in severing the cord.

Modifications in detail may be resorted to without departing from the spirit of the invention or sacrificing any of its advantages.

What is claimed as new is:—

1. A line cutter comprising a body portion with a longitudinal recess and a guard over said recess and a trigger pivotally mounted within said recess in line with and adapted for coaction with said guard to cut the line.

2. A line cutter comprising a body portion having a guard with kerfs at opposite ends disposed at an angle to the longitudinal center of the body portion to receive the line, and a trigger pivotally mounted within the body portion to tilt the latter and sever the line.

3. A line cutter comprising a body portion with a longitudinal recess and a guard extending in vertical alinement with and over said recess, and a trigger pivotally mounted in and normally frictionally held entirely within said recess and beneath said guard.

4. A line cutter comprising a body portion with a longitudinal recess, a trigger pivotally mounted in and normally frictionally held entirely within said recess, and a guard on said body for coöperation with said trigger and having means for holding and guiding a fish line in vertical alinement with said slot.

5. A line cutter comprising a body portion having a guard provided with slots upon one side inclined downwardly toward the body portion and having enlarged inner ends in vertical alinement with the longitudinal central line of the guard and body portion.

6. A line cutter comprising a body portion having a guard provided with slots upon one side inclined downwardly toward the body portion and having enlarged inner ends and a cutter pivotally mounted within said body portion.

7. A line cutter comprising a body portion having a guard provided with slots upon one side inclined downwardly toward the body portion, combined with a trigger mounted within the body portion for coöperation with said guard.

8. A line cutter comprising a body portion having a guard provided with slots upon one side inclined downwardly toward the body portion and having enlarged inner ends, combined with a trigger mounted within the body portion for coöperation with said guard.

9. A line cutter comprising a body portion with recess, a trigger pivotally mounted within the recess and normally frictionally retained therein, and a guard on said body portion spanning said recess and having an abutment for coöperation with said trigger.

10. A line cutter comprising a body portion with recess, a trigger pivotally mounted within the recess and normally frictionally retained therein, and a guard on said body portion spanning said recess and having an abutment for coöperation with said trigger and slots open upon one side to receive the line.

11. A line cutter comprising a body portion with recess, a trigger pivotally mounted within the recess and normally frictionally retained therein, and a guard on said body portion spanning said recess and having an abutment for coöperation with said trigger and slots open upon one side to receive the line, said slots being inclined in opposite directions.

12. A line cutter comprising a body portion with recess, a trigger pivotally mounted within the recess and normally frictionally retained therein, and a guard on said body portion spanning said recess and having an abutment for coöperation with said trigger and slots open upon one side to receive the line, said slots being inclined in opposite directions and enlarged at their inner ends.

13. A line cutter comprising a body portion with recess, a trigger pivotally mounted within the recess and normally frictionally retained therein, and a guard on said body portion spanning said recess and having an abutment for coöperation with said trigger and slots open upon one side to receive the line, said slots being inclined in opposite directions and enlarged at their inner ends, the latter being disposed centrally with relation to the cutting edge of the trigger.

In witness whereof, I have hereunto set my hand this 3rd day of April, 1908, in the presence of two subscribing witnesses.

HENRY A. KUNZE.

Witnesses:
E. B. WHITMORE,
A. M. WHITMORE.